(12) United States Patent
Willmann et al.

(10) Patent No.: US 6,403,260 B1
(45) Date of Patent: Jun. 11, 2002

(54) CARBON PRODUCT RICH IN LITHIUM FOR USE AS NEGATIVE ELECTRODE IN A LITHIUM CELL

(75) Inventors: Patrick Willmann, Montgiscaro; Denis Billaud, Nancy; Laurent Thevenot, Bzuyeres, all of (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 09/530,593

(22) PCT Filed: Nov. 6, 1998

(86) PCT No.: PCT/FR98/02379

§ 371 (c)(1),
(2), (4) Date: May 8, 2000

(87) PCT Pub. No.: WO99/24359

PCT Pub. Date: May 20, 1999

(30) Foreign Application Priority Data

Nov. 7, 1997 (FR) .............................. 97 14042

(51) Int. Cl.⁷ .......................... H01M 4/48; H01M 4/58; C01B 31/00; C01D 1/02; C01D 15/02
(52) U.S. Cl. ................ 429/231.4; 423/415.1; 423/593; 423/641
(58) Field of Search ................ 429/231.4, 231.8, 429/231.9, 231.95; 423/415.1, 593, 641

(56) References Cited

U.S. PATENT DOCUMENTS 5,731,107 A 3/1998 Willmann et al. .......... 429/213

FOREIGN PATENT DOCUMENTS

| EP | 700 106 | * 3/1996 | |
|----|---------|----------|---|
| FR | 2 697 261 | 4/1994 | |
| WO | WO 90/07798 | * 7/1990 | |

OTHER PUBLICATIONS

Essaddek, A., et al. "Intercalation De–Intercalation Phenomena in a Graphite–Sodium–Oxygen Compound Under Potassium Vapor," Comptes Rendus de l'Academie des Sciences: Serie II: Mecanique–Physique–Chimie–Astronomie, vol. 319, No. 9, Nov. 3 1994, pp. 1009–1012.*

El Gadi, M., et al. "A New Graphite Intercalation Compound Containing Sodium Associated With Oxygen," Mol. Cryst. Liq. Cryst. vol. 244, pp. 29–34, 1994 (no month).*

D. Guerard et al., Carbon, vol. 13, no 4, p. 337–345, "Intercalation of lithium into graphite and other carbons", 1975 (no month).

* cited by examiner

*Primary Examiner*—Gabrielle Brouillette
*Assistant Examiner*—Jonathan Crepeau
(74) *Attorney, Agent, or Firm*—Oblon, Spivak, McClelland, Maier & Neustadt, P.C.

(57) ABSTRACT

The invention relates to a lithium-rich carbonaceous substance which can be used as a negative electrode in a lithium accumulator.

This substance has the following formula:

$$LiNa_xC_yO_z \qquad (I)$$

in which x, y and z are such that
$0.4 \leq x \leq 0.6$
$2.5 \leq y \leq 3.5$
$0.2 \leq z \leq 1$ It can be prepared by the insertion of lithium electrochemically in a graphite-sodium-oxygen compound.

8 Claims, 5 Drawing Sheets

CARBON PRODUCT RICH IN LITHIUM FOR USE AS NEGATIVE ELECTRODE IN A LITHIUM CELL

TECHNICAL FIELD

The object of the present invention is a lithium-rich carbonaceous substance comprising lithium, sodium, carbon and oxygen, which can be used in particular as a negative electrode in a lithium electrical accumulator.

It applies to the production of accumulators with a high mass energy which are of great interest for the development of portable electronics and in the long term for the manufacture of electric vehicles. Currently, for these applications, the choice seems to relate to lithium ion batteries because of their very high potential energy per unit mass. For the anode part of these batteries, numerous studies have shown that it is possible to use carbonaceous compounds and in particular graphite.

This is because graphite with a lamellar structure has the property, under the effect of an electric current in an appropriate electrolytic medium, of inserting lithium ions in its structure. The substance obtained is a graphite insertion compound, that is to say there is an invasion of the vacant spaces between the graphite lamellae, also referred to as van der Waals spaces, by the lithium ions.

At the present time, the insertion compound of lithium in graphite which is the richest known has one lithium atom for six carbon atoms, which corresponds to the total formula $LiC_6$ and has an electrochemical capacitance of 372 mA.h.g$^{-1}$. This compound $LiC_6$ is described in Carbon, volume 13, pages 337–345, 1975 [1].

Through FR-A-2 697 261 [2], a polyacetylene-lithium insertion compound is known in which the C/Li ratio is 6, as in the case of the insertion compound of lithium in graphite $LiC_6$.

In order to improve the performance of lithium batteries, it would however be highly advantageous to use, as a negative electrode, compounds containing even more lithium than these known compounds, in order to obtain a higher electrochemical capacitance.

DESCRIPTION OF THE INVENTION

The object of the present invention is precisely a novel carbonaceous substance containing more lithium than any known compounds, which can be used as a negative electrode in a lithium ion battery.

According to the invention, this lithium-rich carbonaceous substance has the following formula:

$$LiNa_xC_yO_z \qquad (I)$$

in which x, y and z are such that:
 $0.4 \leq x \leq 0.6$
 $2.5 \leq y \leq 3.5$
 $0.2 \leq z \leq 1$ The carbonaceous substance of the invention thus contains more lithium than the insertion compound of lithium in graphite $LiC_6$ since the C/Li ratio is situated within the range 2.5 to 3.5, which corresponds to a significant increase in lithium content and an increased electrochemical capacitance (~744 mA.h per gram of carbon).

This lithium-rich carbonaceous substance can be obtained easily from a graphite-sodium-oxygen compound such as the one described by M. El Gadi et al in J. Mol. Cryst. Liquid. Cryst., 244–245, 1994, page 41[3].

The formula of this compound deduced from elemental analyses is:

$$C_{4.75 \pm 0.05} Na O_{0.35 \pm 0.05}$$

According to the invention, the lithium-rich carbonaceous compound is prepared by inserting lithium into a graphite-sodium-oxygen compound of this type. This insertion can be carried out either chemically or electrochemically.

The insertion by chemical method can be effected by means of a method similar to the one described by A. Essaddek et al in C. R. Acad. Sci., Paris, 1. 319, Series II, 1994, pages 1009–1012 [4]), starting from the compound $NAO_{0.5}C_6$ with an ideal theoretical formula derived from crystallographic analysis. In this case, the graphite-sodium-oxygen compound is put in contact with liquid lithium at a temperature and for a period sufficient to obtain the lithium-rich carbonaceous substance of the invention.

It is also possible to start from a graphite-sodium-oxygen compound prepared by putting in contact, in a sealed chamber containing no oxygen, graphite with sodium containing a small quantity of oxygen, at a temperature of 460 to 480° C., and preferably 470° C.

The graphite used for this preparation can be natural or artificial graphite, in flake or powder form with variable granulometries.

By way of examples of graphites which can be used, pyrographite of the PGCCL type supplied by Carbone Lorraine and highly orientated pyrographite HOPG supplied by Union Carbide can be cited.

The small quantity of oxygen present in the sodium can represent 0.5 to 2% by weight for a volume of sodium of 1 to 2 cm$^3$.

Preferably, according to the invention, the insertion of the lithium in the graphite-sodium-oxygen compound is effected electrochemically. In this case, an electrolytic cell with two electrodes is used, one of which is made of lithium and the other one of which consists of the graphite-sodium-oxygen compound, the two electrodes being immersed in an electrolyte comprising a lithium salt.

The electrolyte generally comprises a non-aqueous solvent, for example ethylene carbonate. The lithium salts which can be used may be of different types, but lithium perchlorate is preferred.

In order to effect the electrochemical insertion, the operation is preferably carried out at a temperature of 20 to 90° C. and a potential of 0 volts is imposed between the two electrodes, which can be achieved by connecting the two electrodes by simple short-circuit.

The lithium-rich substance of the invention can be used in particular as a negative electrode in a lithium electrical accumulator.

Thus another object of the invention is an accumulator comprising a negative electrode based on lithium, a positive electrode and an electrolyte conductive by lithium ions in which the negative electrode comprises the lithium-rich carbonaceous substance of the invention.

In this accumulator, the positive electrode can be produced from various materials such as oxides, sulphides or oxysulphides.

By way of example of oxides which can be used, it is possible to cite vanadium oxide $V_2O_5$, nickel oxide $NiO_2$, cobalt oxide $CoO_2$, mixed oxides of cobalt and nickel, manganese oxides, molybdenum oxide $MoO_3$, chromium oxides and vanadium bronzes $MxV_2O_5$ with M representing iron, sodium, potassium, lithium, silver, aluminium, chromium, barium, nickel or cobalt.

By way of examples of sulphides which can be used, titanium sulphide $TiS_2$, molybdenum sulphide $MoS_2$ and mixed sulphides of nickel and molybdenum can be cited.

By way of examples of oxysulphides which can be used, molybdenum and titanium oxysulphides can be cited.

In this electrical accumulator, the electrolyte used generally consists of a solution of lithium salt in a suitable organic solvent.

The organic solvents which can be used are for example propylene carbonate, ethylene carbonate, dimethyl carbonate (DMC), methyl ethyl carbonate (MEC), tetrahydrofuran, 2-methyltetrahydrofuran, dimethoxymethane, dimethoxyethane, N,N-dimethylformamide, sulfolane and mixtures thereof.

The lithium salts which can be used are for example lithium perchlorate $LiClO_4$, lithium hexafluorophosphate $LiPF_6$, lithium hexafluoroarseniate $LiAsF_6$, lithium trifluoromethanesulfonate $LiCF_3SO_3$ and lithium tetrafluoroborate $LiBF_4$.

In the electrolytic accumulator, it is also possible to use as an electrolyte, instead of a solution of lithium salt in an organic solvent, solid electrolytes or polymers conductive by lithium ions.

By way of examples of solid electrolytes, lithium glasses can be cited, obtained for example from $P_2S_5$, $Li_2S$ and $LiI$ or $B_2S_3$, $Li_2S$ and $LiI$.

The polymers conductive by lithium ions can consist for example of poly(ethylene oxide) or poly(propylene oxide) containing a lithium salt such as the salts described above.

In an accumulator of this type using a liquid electrolyte, generally a separator is disposed between the electrodes, and this can consist of a microporous film produced for example from polypropylene or polyethylene.

This accumulator can be produced in the form of a cylindrical accumulator having a spiral winding of the two electrodes separated possibly by the separator. It can also be produced in the form of an accumulator of the prismatic type with plane electrodes facing each other and possibly a separator disposed between these electrodes.

Other characteristics and advantages of the invention will emerge more clearly from a reading of the following description, given of course for illustrative purposes and non-limitatively, with reference to the accompanying drawings.

DETAILED DISCLOSURE OF EMBODIMENTS

EXAMPLE 1

Synthesis of the Graphite-sodium-oxygen Compound

In order to prepare this compound use is made of a steel reactor having two compartments placed one above the other and separated by a metallic grille. In the bottom compartment, metallic sodium containing a small quantity of oxygen is introduced, and in the top compartment pyrographite wafers of the PGCCL type supplied by Le Carbone Lorraine are deposited. This reactor was assembled in a pure argon atmosphere, that is to say one free of any trace of oxygen. The airtightness of the reactor was ensured by means of an O-ring seal made of copper, and, in order to prevent accidental contamination of the reaction medium, the reactor is placed in a glass tube in which a primary vacuum is produced. The assembly consisting of the tube containing the reactor is then placed in a vertical oven and is raised to a temperature of 200° C. for 12 hours. The sodium, with slight oxygen content, is then in the liquid state.

The reactor is then removed from its tube and is placed immediately in a centrifuge. After centrifugation for 15 minutes at 5000 rev/min, the liquid reaction medium invades the compartment containing the sample of pyrographite. The reactor is then replaced in the reverse position, that is to say by placing the top compartment at the bottom, and it is put back in the tube, in which a primary vacuum is produced. The reaction mixture is then heated at a temperature of 470° C. for three days, and then the graphite is separated from the reaction medium by centrifugation under the same conditions as before. In this way a blue-coloured graphite-sodium-oxygen compound is obtained.

This compound is characterised by X-ray diffraction using a conventional θ/2θ diffractometer having a molybdenum source (·=0.72926 pm) and a quartz monochromator, mounted in series, and finally a scintillation counter. The sample is placed in a pure argon atmosphere in a Lindeman tube, which is then sealed.

Figure 1:
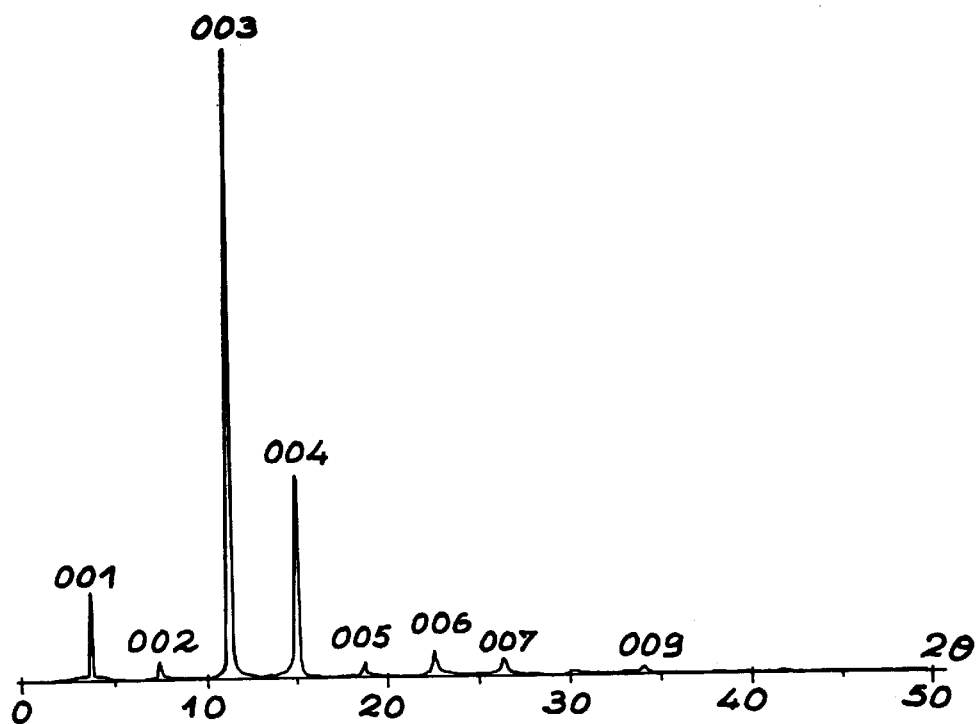
FIG. 1 depicts the X-ray diffraction spectrum giving the 001 reflections of the graphite-sodium-oxygen compound prepared in Example 1.

FIG. 1 illustrates the X-ray diffraction spectrum presenting the 001 reflections of this compound. This diffractogram makes it possible to calculate the identity period of the compound, which is 1080 pm.

Figure 2:
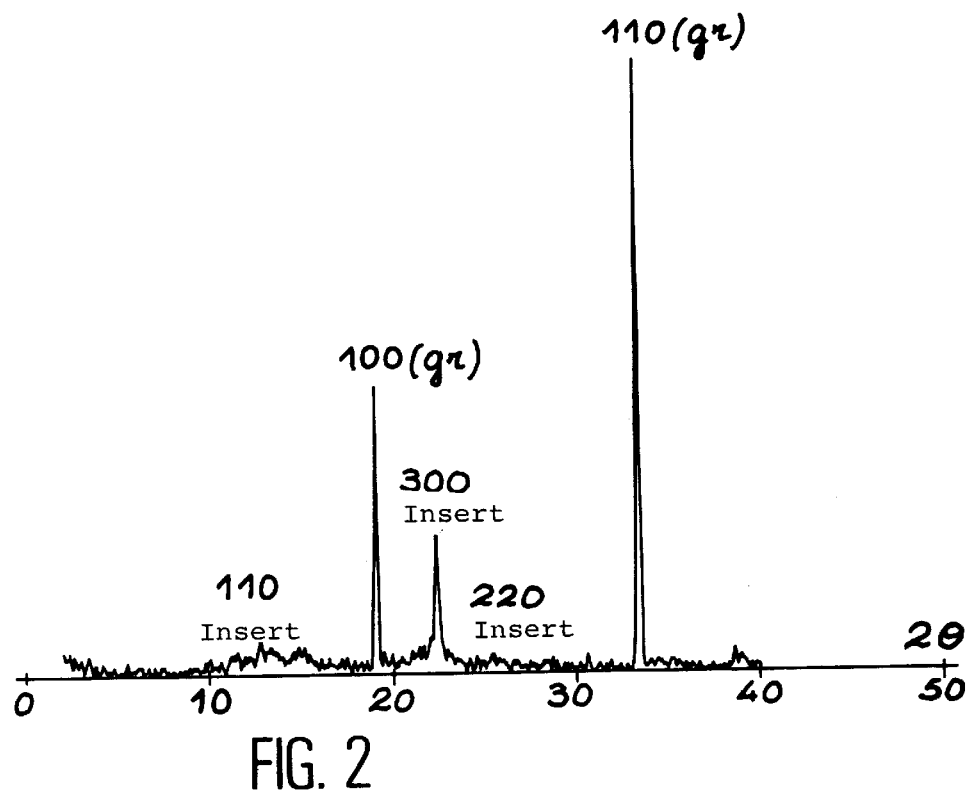
FIG. 2 depicts the X-ray diffraction spectrum presenting the hk0 reflections of the graphite-sodium-oxygen compound of Example 1.

FIG. 2 depicts the spectrum corresponding to the hk0 reflections of this compound. It shows the 100 and 110 peaks of graphite as well as the peaks of lower intensity due to the insertion of sodium accompanied by oxygen between the graphite flakes (ternary compound).

An electron diffraction analysis of this compound is carried out on a sample of crushed pyrographite in a pure argon atmosphere which is placed on an amorphous carbon grille with holes. This analysis reveals spots due to the graphite as well as spots due to the sodium inserted between the graphite planes.

EXAMPLE 2

Preparation of a Lithium-rich Substance of Formula $LiNa_xC_yO_z$ (with x=0.4–0.6, y=2.5–3.5 and z=0.2 to 1)

This substance is obtained by electrochemical insertion of lithium whose graphite-sodium-oxygen compound was prepared in Example 1.

For this purpose, a sealed cell with two electrodes is used, in which a primary vacuum is produced.

One of these two electrodes consists of a lithium ribbon held in a titanium clamp serving as a reference and counter-electrode, the other electrode, or working electrode, consists of the blue coloured graphite-sodium-oxygen compound prepared in Example 1, which is also held by a titanium clamp.

The two electrodes are immersed in an electrolytic mixture consisting of ethylene carbonate (EC) and lithium perchlorate $LiClO_4$ in the following proportions:

1.5 mol of $LiClO_4$ per kg of ethylene carbonate.

The two constituents of the electrolyte are degassed under vacuum before being mixed. The lithium salt LiClO$_4$ was degassed under primary vacuum at 150° C. for 4 hours; the ethylene carbonate solvent was degassed under primary vacuum at room temperature for two hours.

In order to effect the electrochemical insertion of the lithium ions, the operation is carried out at a temperature of 20 to 90° C., for example at 80° C., imposing a potential between the two electrodes of 0 volts by means of a potentiostat/galvanostat. It is also possible to effect the insertion by simple short-circuit, and therefore by connecting the two electrodes.

The progress of the reaction is governed by kinetic problems: it depends on the specific surface area of the graphite for a given concentration of the electrolyte and also the temperature.

After a maximum reaction time of 30 days, the lithium-rich substance is obtained, whose theoretical composition formula is as follows:

$$LiC_3Na_{0.5}O_{0.25}$$

This substance is characterised by X-ray diffraction and by electron diffraction as in Example 1.

Figure 3:
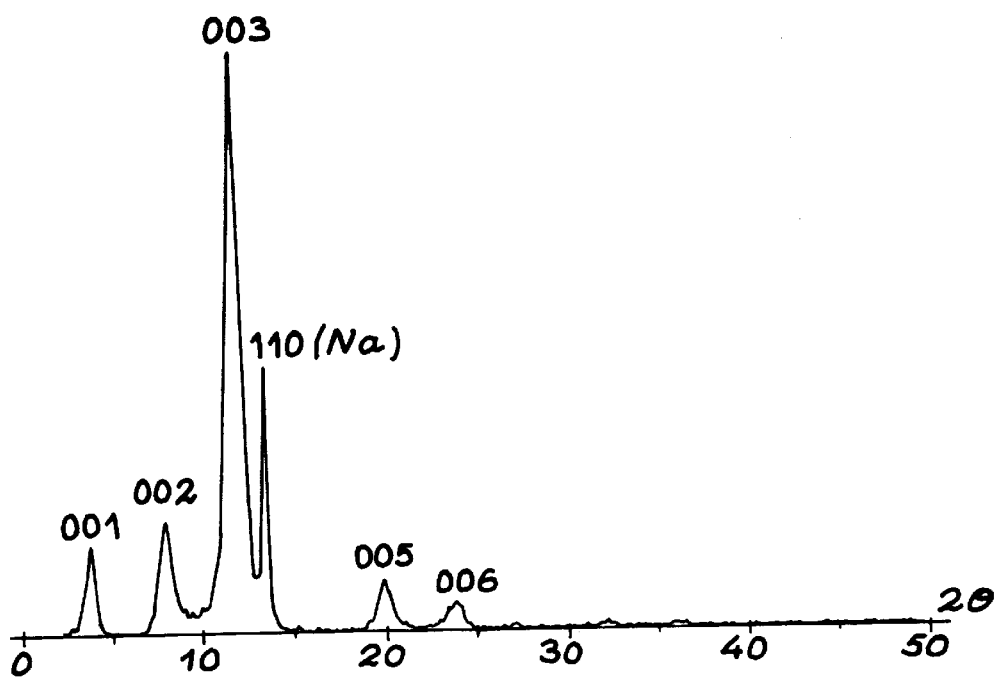
FIG. 3 depicts an X-ray diffraction spectrum presenting the 001 reflection of the lithium-rich substance of the invention.

FIG. 3 depicts the diffractogram for the 001 reflections of this lithium-rich substance. From this diffractogram the identity period of the substance is calculated, which is around 1035 pm. In addition to the 001 reflections, the diffractogram shows the 110 reflection of the metallic sodium.

Figure 4:
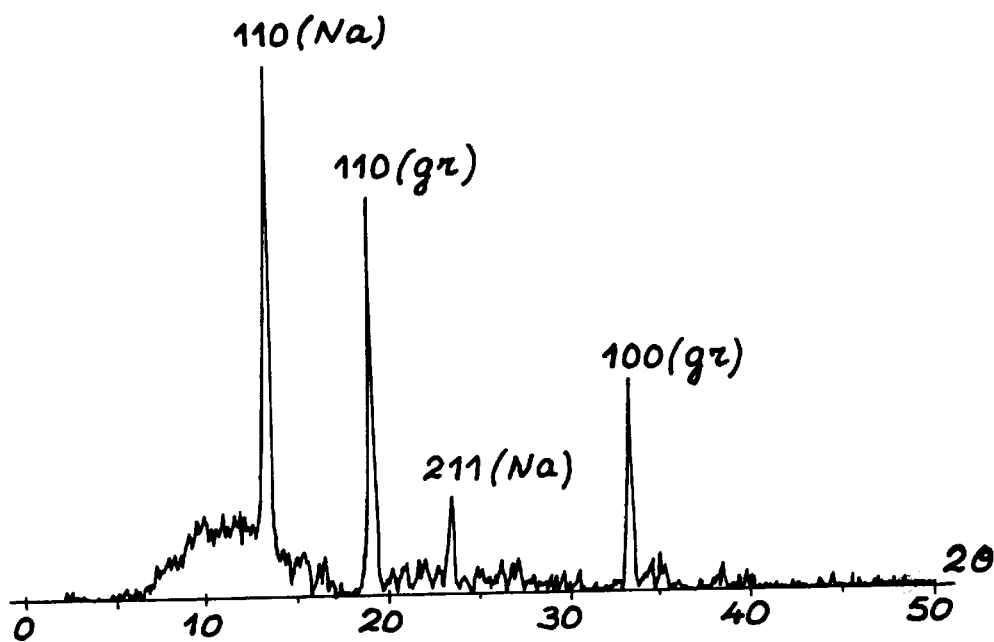
FIG. 4 depicts the X-ray diffraction spectrum presenting the hk0 reflections of the lithium-rich substance of the invention.

FIG. 4 depicts the diffractogram for the hk0 reflections of this substance. This exhibits the characteristic 110 and 100 reflections of graphite as well as 211 and 110 reflections of metallic sodium.

The electron diffraction analysis shows visible spots due to the graphite as well as fine spots attributed to the metallic sodium. In addition a new spot is found due to the insertion of the lithium.

Figure 5:
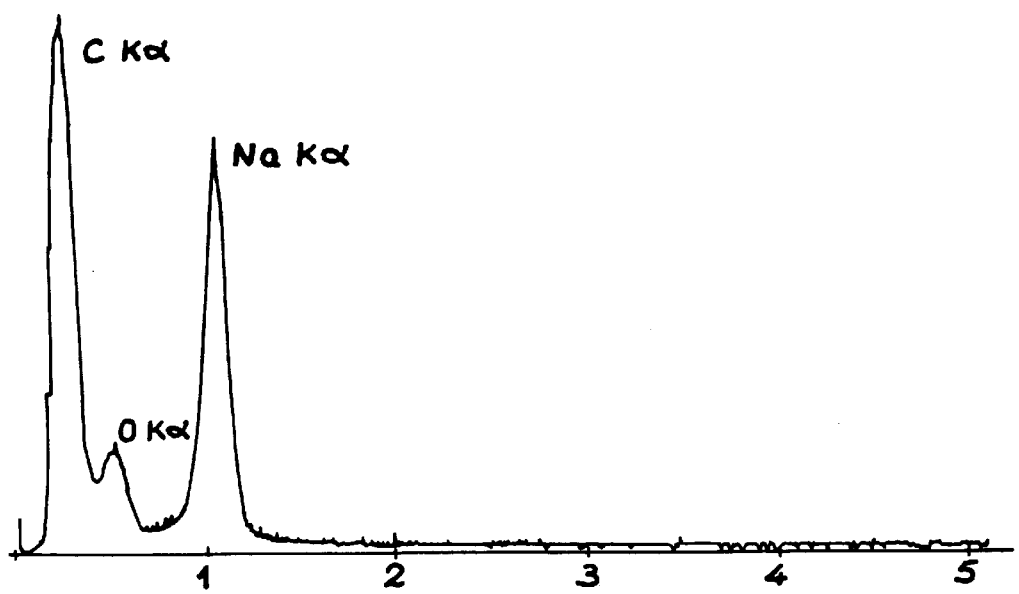
FIG. 5 illustrates the X-ray emission spectrum (EDX) of the lithium-rich substance of the invention.

FIG. 5 depicts the X-ray emission spectrum of this substance. It shows the following elements: carbon, oxygen and sodium.

Figure 6:
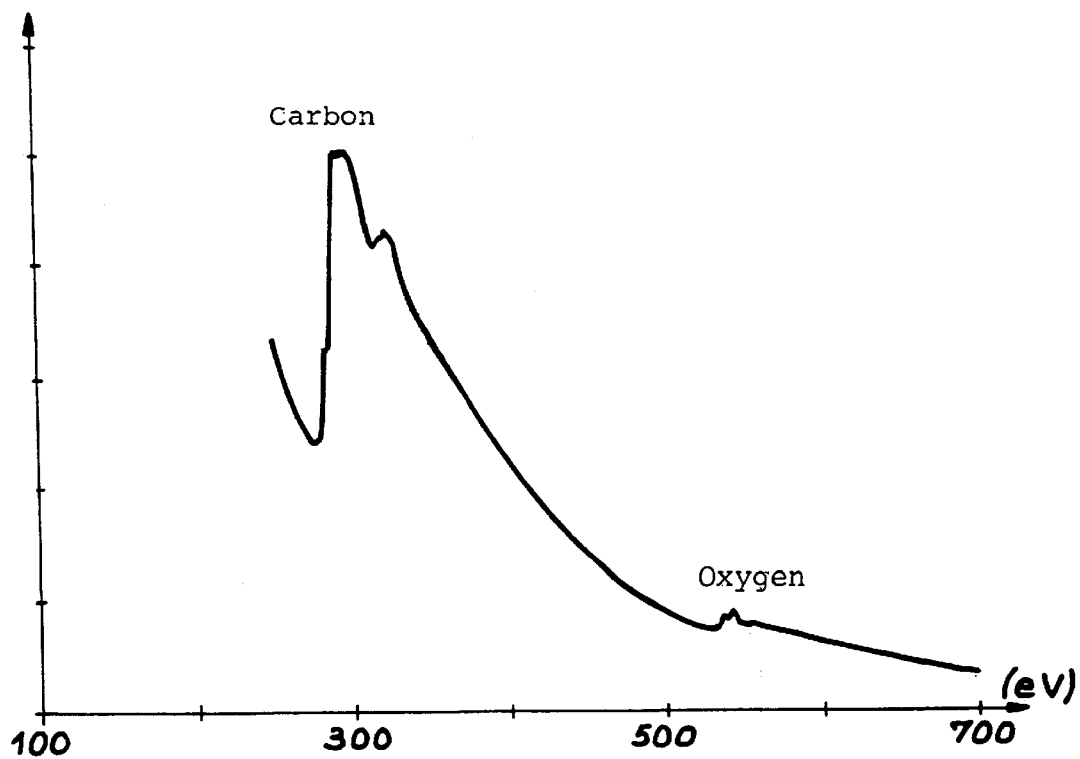
FIGS. 6 to 8 illustrate the electron energy loss spectra (EELS) of the lithium-rich substance of the invention and confirm the presence of oxygen (FIG. 6), sodium (FIG. 7) and lithium (FIG. 8)
Figure 7:
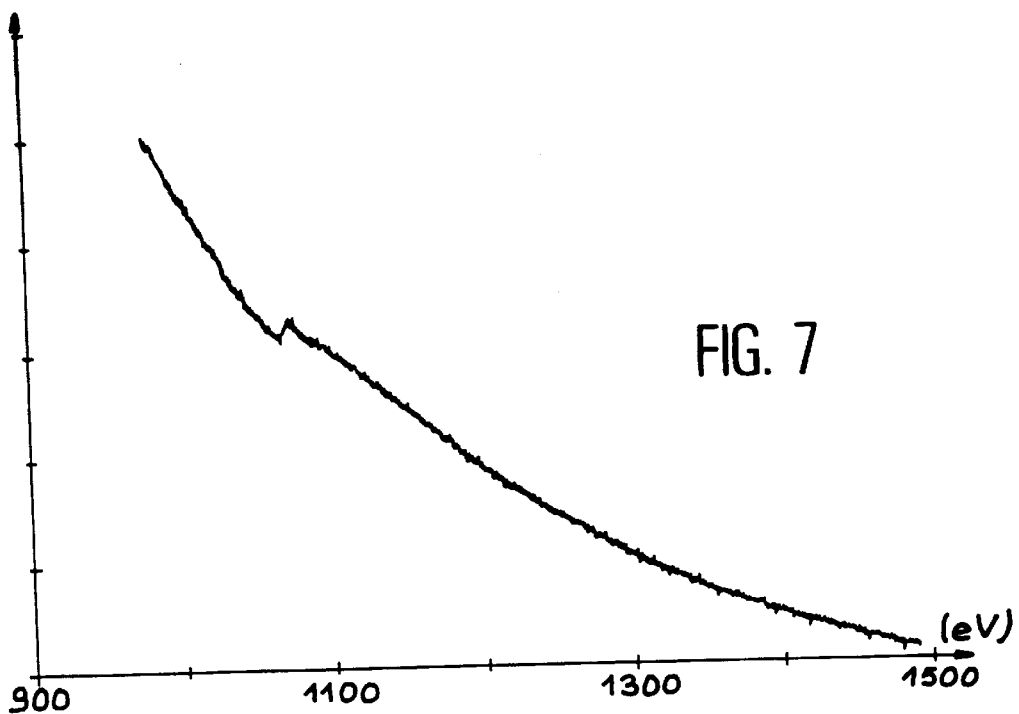
Figure 8:
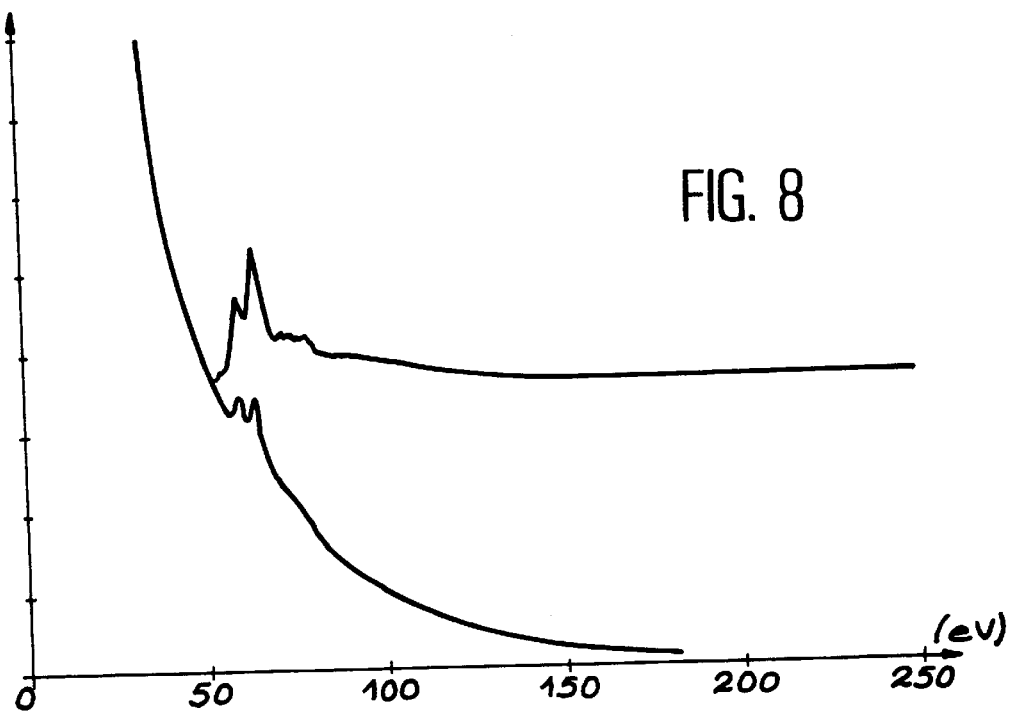

FIGS. 6 to 8 depict the energy loss spectra of the electrons which confirm the presence of carbon and oxygen (FIG. 6), sodium (FIG. 7) and lithium (FIG. 8).

Quantitative analysis of these elements detected by this technique confirms the elemental analysis carried out initially, that is to say the formula $$LiNa_xC_yO_z$$

with:
x=0.4–0.6
y=2.5–3.5
z=0.2–1 corresponding to the ideal formula: LiC$_3$Na$_{0.5}$O$_{0.25}$.

Figure 9:
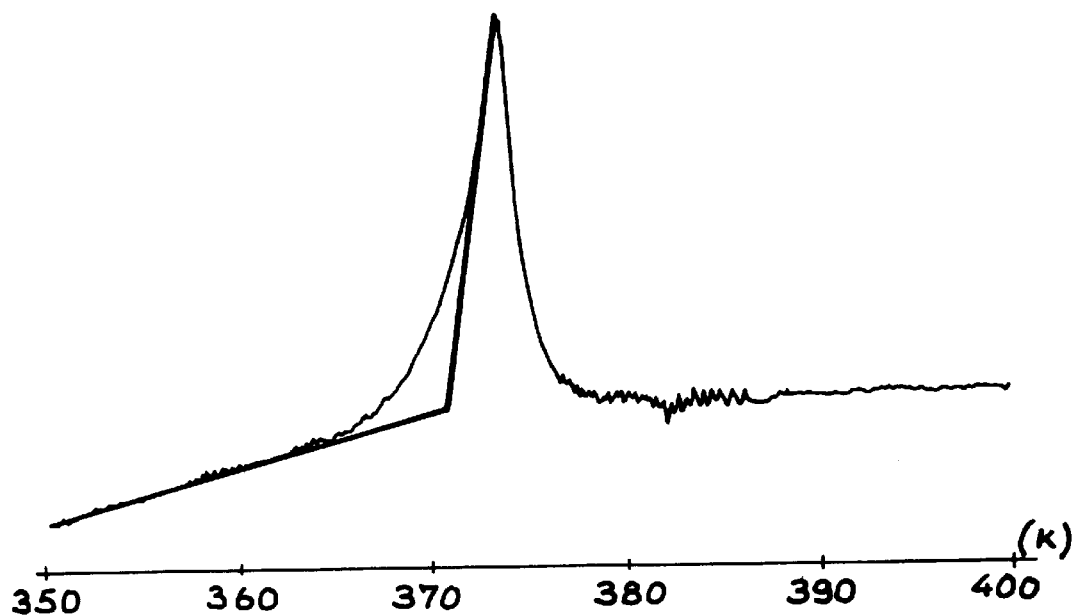
FIG. 9 is a curve illustrating the differential thermal analysis of the lithium-rich compound of the invention.

FIG. 9 depicts the curve for differential thermal analysis in an argon atmosphere of the substance obtained. On this curve there can be seen the fusion peak corresponding to the fusion of the metallic sodium, which confirms the presence of sodium in metallic form in this compound.

EXAMPLE 3

Preparation of a Lithium-rich Substance of Formula LiNa$_x$C$_y$O$_z$ (x=0.4–0.6, y=2.5–3.5, z=0.2–1)

In this example, the starting point is the graphite-sodium-oxygen compound of Example 1, and lithium is inserted in it chemically.

For this purpose, a two-compartment reactor of the same type as in Example 1 is used and the blue coloured graphite-sodium-oxygen compound is placed in the top compartment and the bottom compartment is filled with lithium.

The operation is carried out as in Example 1 by placing the reactor in a glass tube in which a primary vacuum is produced, and then the liquid lithium and the compound are brought into contact by centrifugation at 5000 rev/min for fifteen minutes. To melt the lithium, the whole is heated at 200° C. for twelve hours, and the reaction is carried out at 200° C. for a maximum period of ten days.

In this way the lithium-rich substance of formula LiNa$_x$C$_y$O$_z$ is obtained, which has the same characteristics as that obtained in Example 2.

Thus the invention makes it possible to obtain a substance with a much greater lithium content than LiC$_6$, which results in a doubling of the electrochemical capacitance of the graphite. In this substance, the lithium inserted in the graphite-sodium-oxygen compound is therefore substituted for the sodium, which then forms metallic inclusions between the graphite wafers.

In this substance there are successive layers interposed between the graphite wafers which do not have the same chemical composition, that is to say Li/O/Li/O/Li layers where O is the oxygen engaged in a peroxide ion O$_2^{2-}$, and layers of Li, with one layer of Li for five layers of Li/O/Li/O/Li. The sodium is situated in inclusions diffused in the substance.

Such a substance can be used in a lithium accumulator as a negative electrode.

Figure 10:
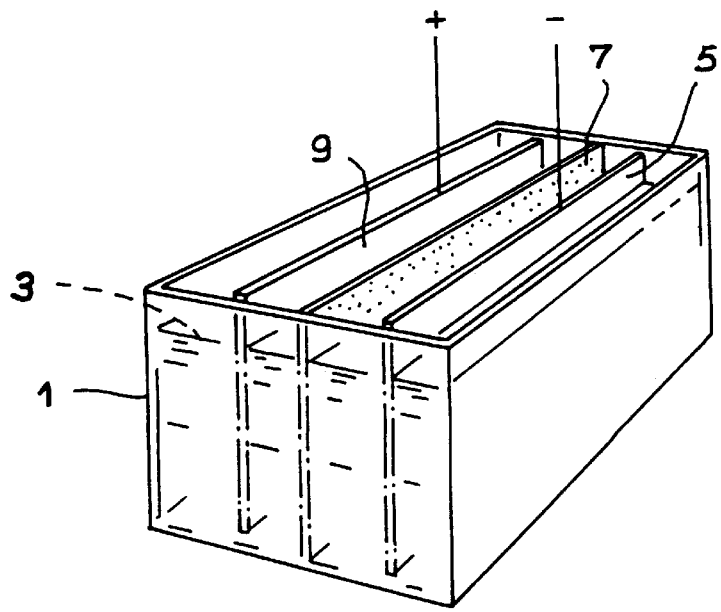
FIG. 10 is a schematic representation of an electrical accumulator according to the invention.

FIG. 10 depicts a lithium electrical accumulator using the lithium-rich carbonaceous substance of the invention, with the formula:

$$LiNa_xC_yO_z \qquad (I).$$

In this figure, it can be seen that the accumulator comprises a receptacle 1 made of polytetrafluoroethylene, filled with an electrolyte 3 consisting for example of ethylene carbonate containing 1 mol/l of lithium perchlorate, in which there are disposed successively a negative electrode 5 consisting of the lithium-rich carbonaceous substance of formula (I) of the invention, a separator 7 consisting of a microporous polypropylene membrane, and a positive electrode 9 made of vanadium oxide.

REFERENCES CITED

[1] Carbon, Vol. 13, 1975, pages 337–345
[2] FR-A-2 697 261
[3] J. Mol. Cryst. Liquid Cryst., 244–245, 1994, page 41
[4] C. R. Acad. Sci. Paris. t. 319, Series II, 1994, pages 1009–1012

What is claimed is:

1. A lithium-rich carbonaceous substance with die following formula:

$$LiNa_xC_yO_z \qquad (I)$$

in which x, y and z are such that
0.4≦x≦0.6
2.5≦y≦3.5
0.2≦z≦1.

2. A lithium electrical accumulator comprising a negative electrode based on lithium, a positive electrode and an electrolyte which is conductive by lithium ions, in which the negative electrode comprises a lithium-rich carbonaceous substance with the formula:

$$LiNa_xC_yO_z \quad (I)$$

in which x, y and z are such that 0.4≤x≤0.6

2.5≤y≤3.5

0.2≤z≤1.

3. A method of preparing a lithium-rich carbonaceous substance with the following formula:

$$LiNa_xC_yO_z \quad (I)$$

in which x, y and z are such that 0.4≤x≤0.6

2.5≤y≤3.5

0.2≤z≤1 according to which a graphite-sodium-oxygen compound is put in contact with lithium in order to insert lithium ions therein.

4. A method according to claim 3, in which the insertion is carried out electrochemically in an electrolytic cell with two electrodes, one of which is made of lithium and the other from the graphite-sodium-oxygen compound, the two electrodes being immersed in an electrolyte comprising a lithium salt.

5. A method according to claim 4, in which the electrolyte is a mixture of ethylene carbonate and lithium perchlorate.

6. A method according to claim 4, in which the operation is carried out at a temperature of 20 to 90° C., by imposing a potential of 0 volt between the two electrodes or connecting the two electrodes.

7. A method according to claim 3, in which the graphite-sodium-oxygen compound has the formula $C_{4.75\pm0.05}NaO_{0.35\pm0.05}$.

8. A method according to claim 3, in which the graphite-sodium-oxygen compound is prepared by putting in contact, in a sealed chamber containing no oxygen, graphite with liquid sodium containing a small quantity of oxygen, at a temperature of 460 to 480° C.

* * * * *